March 25, 1958 — M. E. RICKE — 2,828,005

DISPENSER

Filed Nov. 2, 1954

INVENTOR
MAURINE E. RICKE
BY
Gardner & Zimmerman
ATTORNEYS

United States Patent Office 2,828,005
Patented Mar. 25, 1958

2,828,005

DISPENSER

Maurine E. Ricke, Danville, Calif.

Application November 2, 1954, Serial No. 466,283

3 Claims. (Cl. 206—42)

The present invention relates to an improved dispenser wherein the items dispensed are counted so that an accurate count thereof is at all times available.

The dispenser of the present invention is portable and quite compact and lightweight so as to be readily carried about by one dispensing items therefrom. Although various different items may be disposed within and dispensed by the device of the present invention, particular utility is found in the dispensing of drugs or other medicaments as in the form of pills or capsules wherein it is very important to keep an accurate count of the number of items dispensed. In the provision of capsular medicines to patients it is necessary to insure correctness not only in the overall number administered but also in the dispensing of each individual item. For example, a nurse administering capsules even to an individual patient can forget the exact number already given or may have difficulty in remembering whether a particular required capsule has been given, inasmuch as nurses have a large number of patients and may need to provide like medicines of the same or differing quantity to each.

The dispenser of the present invention is adapted to contain a multiplicity of individual items separate from each other and to be operable for dispensing same individually in succession while indicating visually the number dispensed. The device cannot be actuated except in the forward direction to make available or dispense additional items and thus no possibility of faulty indication is present. Also the invention is quite simple and inexpensive as it includes but a minimum of parts and is thus inexpensive and easily manufactured and maintained.

It is an object of the present invention to provide an improved portable dispenser.

It is a further object of the present invention to provide a portable dispenser visually indicating at all times the number of items dispensed.

A still further object of the present invention is to provide a portable dispenser having an apertured plate rotatable between successive aligned positions with separate compartments and having visual indicia of the number of aligned positions previously encountered.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing wherein.

Figure 1:
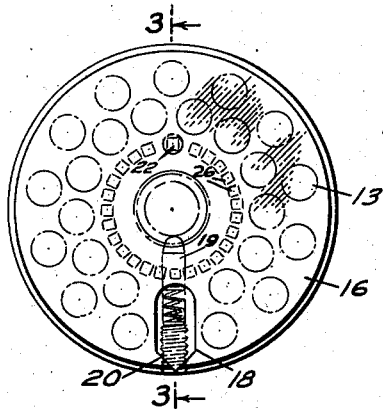
Figure 1 is a plan view of one preferred embodiment of the invention.
Figure 2:
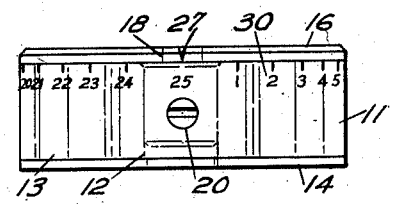
Figure 2 is an elevational view of the embodiment of the invention shown in Figure 1.

Considering first the structural details of the embodiment of the invention illustrated in Figures 1–5, and referring to these illustrations in the drawings, there will be seen to be provided a generally cylindrical relatively thin carrier member 11. The carrier member has a central axial aperture 12 piercing the same, and there are additionally provided in the carrier 11 a plurality of cylindrical bores 13 spaced evenly thereabout and having their centers disposed, for example, along the circumferences of two circles of different diameters. The bores 13 have their centers displaced equally apart about the circumference of the carrier 11. A bottom plate 14 is disposed on the bottom of the carrier 11 and is coextensive therewith. This plate 14 has a central aperture mating with the aperture 12 in the carrier member and is secured to the carrier member in closing relation to the carrier bores 13 which then become cavities 13 with the upper ends only open.

Atop the carrier 11 is a dispenser plate member 16 which has attached thereto or formed integral therewith a central depending shaft 17 of such a diameter as to slidably engage the central aperture 12 in the carrier 11. The dispenser plate 16 is provided with a single transverse aperture 18 which pierces the plate parallel to the shaft 17 and which extends radially of the dispenser plate substantially from the shaft edge to the outer circumference of the plate. This dispenser aperture has a width equal to the diameter of the carrier cavities 13 so that upon rotation of the dispenser plate upon the carrier, the carrier cavities are successively opened at their tops while all other cavities are closed by the dispenser plate.

There are provided interengaging spring snap means for maintaining the dispenser plate 16 in closing relationship to the top of the carrier 11. In the particular embodiment of the invention illustrated in Figures 1 through 5 this connector or retaining means comprises a spring loaded slug 19 disposed in a radial aperture in the carrier 11 closed by a threaded plug 20 with the slug engaging at an inner curved end thereof a circumferential curved slot 21 about the shaft 17. This retaining means maintains the cover or dispensing plate 16 in position atop the carrier 11 while allowing relative rotation of these elements and yet permits disconnection of the dispenser plate and shaft from the carrier by depression of the spring that forces the slug 19 radially inward into the shaft slot 21. Various means are suitable to prevent undue movement of the retaining means slug 19 upon removal of the shaft from the carrier, as for example the provision of a shoulder about the radial carrier aperture so that the slug 19 can move only a limited distance into the axial carrier aperture when the shaft is removed therefrom, as shown.

Figure 4:
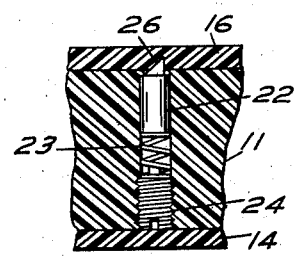
Figure 4 is a partial sectional view taken as indicated at 4—4 of Figure 3 and illustrating the ratchet mechanism.
Figure 5:
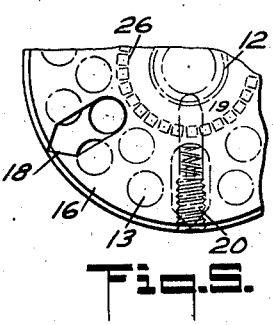
Figure 5 is a partial plan view showing the invention in a displaced dispensing position.

An additional feature of the invention is the provision of ratchet means limiting relative rotation of the carrier and dispensing plate to a single direction and providing a relative position of stability at each position of alignment of dispenser aperture 18 and carrier cavity 13. These means include a vertical bar or pawl 22 having a small chisel-shaped upper end and disposed within a vertical aperture in the carrier 11 having a reduced opening at the top through which the chisel end of the pawl protrudes. Below the pawl 22 is a spring 23 supported by a plug 24 threaded into the carrier at the bottom of the aperture therein so that the pawl is spring loaded to remain normally protruding from the carrier top surface and is depressible therefrom against the spring pressure. Square or rectangular ratchet indentations 26 are formed on the under surface of the dispenser plate 16 about a circle having a diameter equal to the radial displacement of the ratchet aperture in the carrier 11. The ratchet indentations in the dispenser or cover plate 16 are spaced apart and oriented with respect to the pawl 22 and dispenser aperture 18 so that one indentation is engaged by the pawl each time the dispenser aperture 18 is aligned with a carrier cavity 13. The ratchet indentations 26 are V-shaped in radial section with one side of the V vertical and the chisel end of the pawl 22 is likewise formed and disposed, as best seen in Figure 4 so that rotation of the dispenser plate is possible only in a single forward direction and reverse rotation thereof is prevented by engagement of vertical surfaces of the pawl and mating indentations.

It will be noted that both the hereinbefore described ratchet means and the means removably connecting the dispenser plate member with the carrier member, are advantageously located wholly within the confines of the carrier member and dispenser plate member.

One further feature completes the device and this is a series of numbers 30 scribed or otherwise marked upon the carrier 11 about the circumference thereof. In this respect note that the carrier cavities 13 are disposed entirely about the carrier except for one portion which is left blank without cavities as a starting point or zero setting of the dispenser plate whereat no cavities are opened when the dispenser aperture is there disposed. Considering the instance where the device is adapted to indicate the number of items remaining in the carrier cavities and some twenty-five cavities are disposed about the carrier, the number "25" is scribed radially outward from the blank portion of the carrier and a mark 27 upon the dispenser plate extends from the dispenser aperture radially outward therefrom to the dispenser periphery. Initial positioning of the mark 27 in alignment with the numeral "25" indicates that no cavities are opened so that twenty-five remain full. Rotation of the dispenser plate to align the dispenser aperture 18 with the first cavity 13 adjacent the blank carrier space also aligns the dispenser mark 27 with the carrier numeral "24," thereby indicating that some twenty-four cavities remain unopened.

With regard to the operation of the dispenser of the present invention same is first to be filled with items to be dispensed such as capsules 28. Rapid filling of the carrier cavities is facilitated by removal of the covering dispenser plate from the carrier and this may be accomplished by thumb pressure applied upwardly to the bottom of the shaft 17 through the bottom of the central carrier aperture 12 to overcome the force of the detent spring. The shaft and attached dispenser plate 16 are raised from the carrier and capsules 28, for example, are inserted in each carrier cavity 13. The dispenser plate 16 is then replaced with the mark 27 thereon aligned with the number "25" so that the dispenser aperture 18 lies above the blank carrier space out of alignment with any and all carrier cavities. With the device thus filled it is ready for use and each successive capsule 28 desired to be removed therefrom is readily available by rotating the dispenser plate 16 one notch of the ratchet to align the dispenser aperture 18 with the next adjacent cavity 13 containing a capsule. The mark 27 is at all times aligned with a number on the carrier periphery indicating the number of cavities that have been opened, including the one then presently open. The dispenser plate 16 is retained from reverse rotation so that no error in the above indication is possible. If desired the dispenser plate and/or carrier and other portions of the device may be formed of a transparent plastic for convenience and inexpensiveness of construction as well as to afford a view of the dispenser contents.

Figure 3:
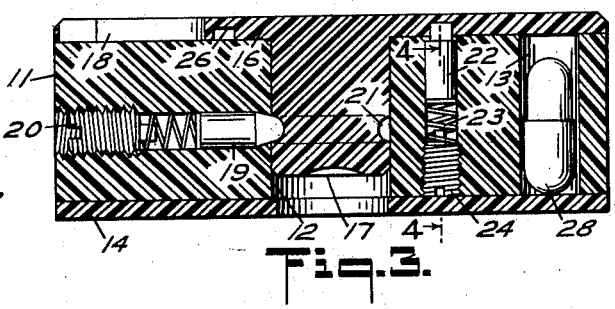
Figure 3 is a transverse sectional view taken on a diameter of the device as indicated at 3—3 of Figure 1.
Figure 6:
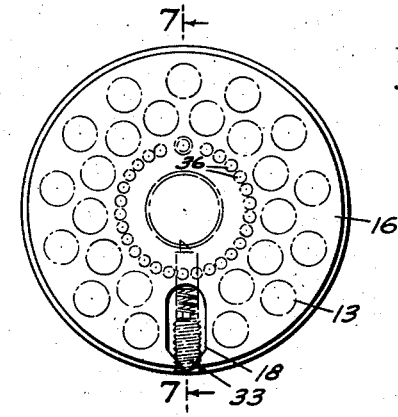
Figure 6 is a plan view of an alternative embodiment of the invention.
Figure 7:
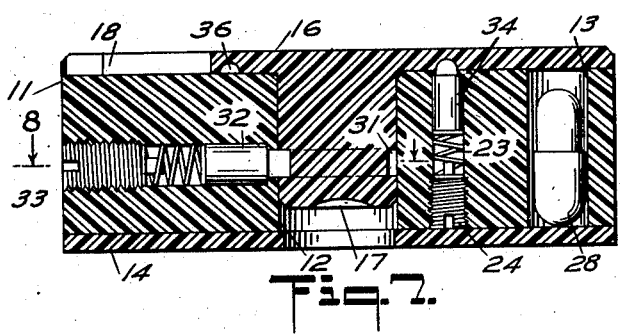
Figure 7 is a central sectional view taken on a diameter of the invention as indicated at 7—7 of Figure 6.
Figure 8:
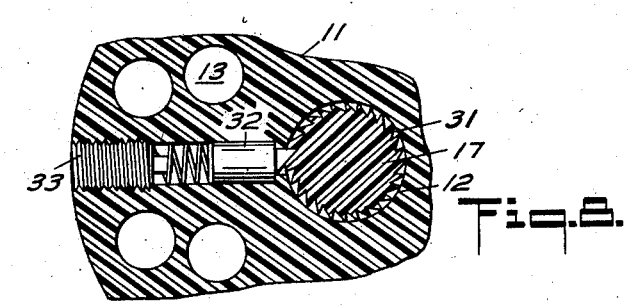
Figure 8 is a partial sectional view taken at 8—8 of Figure 7 and showing the ratchet mechanism of the embodiment of Figure 6.

An alternative embodiment of the invention shown in Figures 6, 7, and 8 is generally the same as the above-described embodiment and like parts are similarly numbered. In this embodiment the same carrier 11, bottom plate 14 and dispenser plate 16 are provided, however, instead of a circumferential shaft slot 21 there is formed about the shaft circumference within the central carrier aperture a succession of adjacent notches 31 with each having one side disposed radially of the shaft 17 and the other side at an angle thereto, as shown in Figure 8. The slug 19 of Figure 3 is replaced by a bar 32 having a small chisel-shaped end in plan view and adapted to fit into the shaft notches 31 with the bar 32 being spring loaded, as shown, to force same radially inward of the carrier into engagement with the shaft notches. A plug 33 is threaded into a radial carrier aperture wherein the bar 32 is disposed to retain the spring therein behind the bar and this plug 33 may be threaded into and out of the carrier to adjust the spring pressure and to entirely release same. The ratchet means of the embodiment of Figure 3 may be replaced with a spring loaded round-nosed member 34 extending through the top of the carrier and engaging the dispenser plate in an annular groove or a succession of dished depressions 36 in the under surface of the dispenser plate. Otherwise the two embodiments herein illustrated are alike, as is the operation, so that no further description thereof is required.

What is claimed is:

1. A device for singly dispensing pills, capsules or the like, comprising a generally cylindrical relatively thin carrier member of a size to be carried in the hand and having a central axial opening and a plurality of cavities circumferentially spaced thereabout and extending substantially parallel to the axis of the carrier member into the same from one side face thereof to contain the items to be dispensed, a dispenser plate member rotatably fitting upon that side face of the carrier member from which said cavities extend, in closing relation therewith for rotary adjustment relative thereto, said dispenser plate member having a laterally projecting part extending centrally thereof from the inner side face of the same in line with said axial opening in the carrier member, said dispenser plate member having a single aperture therein for register successively with said carrier member cavities, and the carrier member cavities being so spaced thereabout that there is a blank area between certain of the cavities with which the aperture in the dispenser plate member in one position thereof is adapted to register so that in that position of the dispenser plate member it closes all of said cavities, means rotatably but removably connecting the dispenser plate member with the carrier member, said means including interengaging spring snap means between the dispenser plate member and carrier member, and ratchet means comprising cooperating parts on said carrier member and dispenser plate member for limiting rotary movement of the dispenser plate member relative to the carrier member to one direction only, step by step, and said ratchet means being so correlated with the spacing of the carrier member cavities thereabout whereby at each ratchet controlled step adjustment of the dispenser plate member from the position at which its aperture registers with said blank area of the carrier member, the aperture of the dispenser plate member will register with one of the carrier cavities, said connector means and ratchet means being located wholly within the confines of the carrier member and dispenser plate member.

2. The invention according to claim 1, wherein said laterally projecting part is in the form of a shaft fitted for rotation in said central axial opening, and said means removably connecting the dispenser plate with the carrier member embodies a radial bore in said carrier member opening into said axial opening, a member reciprocably supported in the inner end of said bore and constantly urged inwardly and having a detent portion extendable into the axial opening, and means substantially encircling the shaft in line with said bore for receiving said extendable portion of the reciprocable member.

3. The invention according to claim 1, wherein said ratchet means embodies a bore in the carrier member paralleling said axial opening and having an inner end opening through the said one side face of the carrier member, a spring loaded member reciprocably supported in the inner end of said bore and having a detent portion extendable from the bore against the adjacent side of the dispenser plate, and an annular series of indentations in the said adjacent side of the dispenser plate concentric with said axial bore for receiving said detent portion of the spring loaded member.

References Cited in the file of this patent

UNITED STATES PATENTS

| | | |
|---|---|---|
| 173,543 | Howe | Feb. 15, 1876 |
| 1,060,979 | Hamilton | May 6, 1913 |
| 1,127,574 | Anderson | Feb. 9, 1915 |
| 1,737,643 | Conner | Dec. 3, 1929 |
| 2,176,232 | Warren | Oct. 17, 1939 |

FOREIGN PATENTS

| | | |
|---|---|---|
| 712,676 | France | of 1931 |
| 936,402 | France | of 1948 |